Aug. 9, 1949.  C. R. LEMONIER ET AL  2,478,830
CONTROL SURFACE BALANCING MEANS
Filed June 7, 1944  2 Sheets-Sheet 1
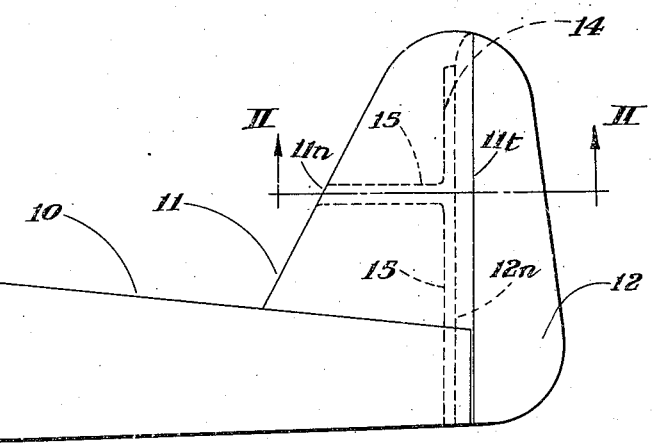
Fig.1
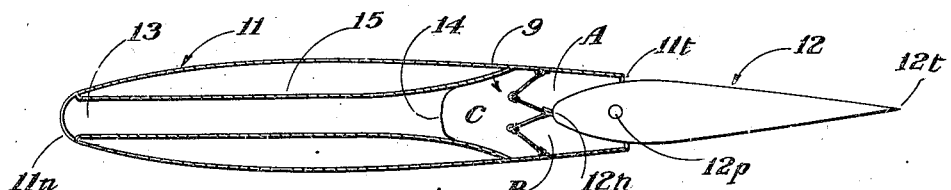
Fig.2
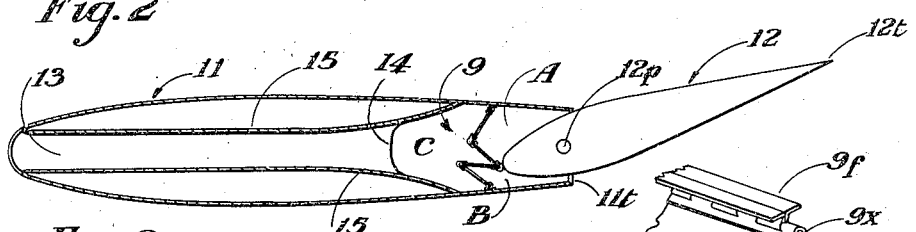
Fig.3
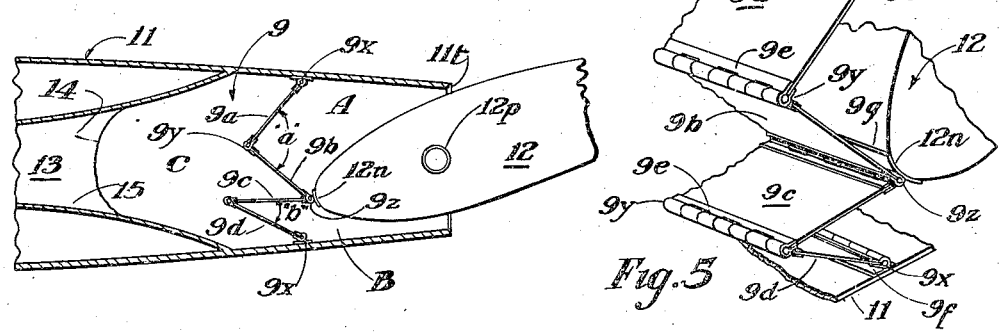
Fig.4  Fig.5
Camille R. Lemonier INVENTORS
and Robert E. Waldron
BY 
ATTORNEY

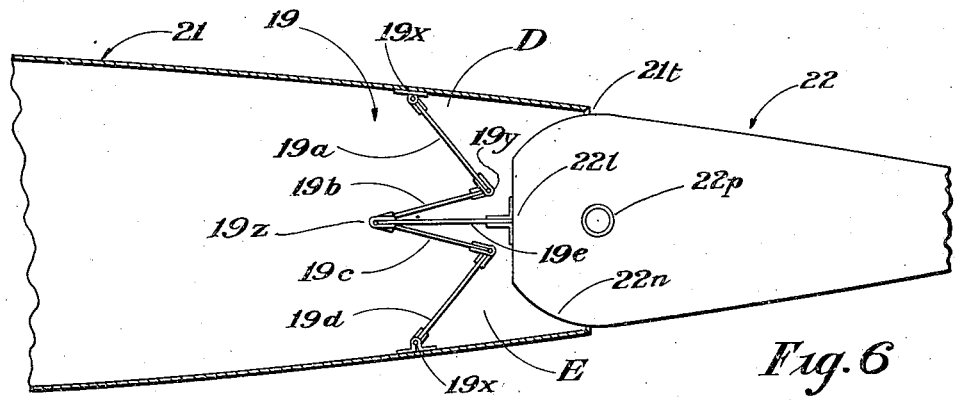
Fig. 6
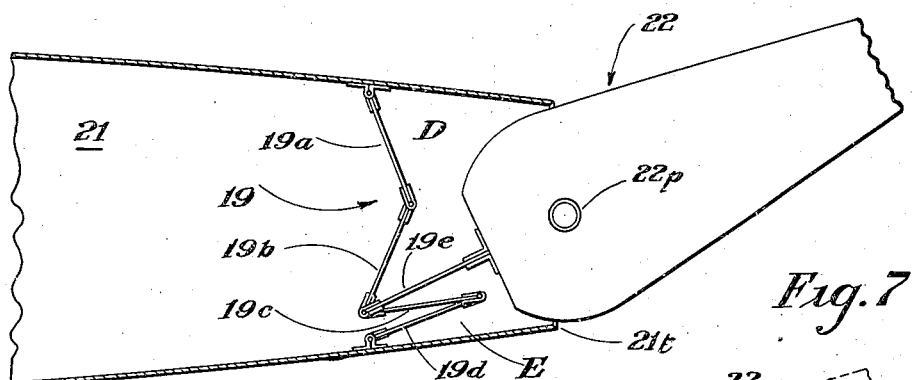
Fig. 7
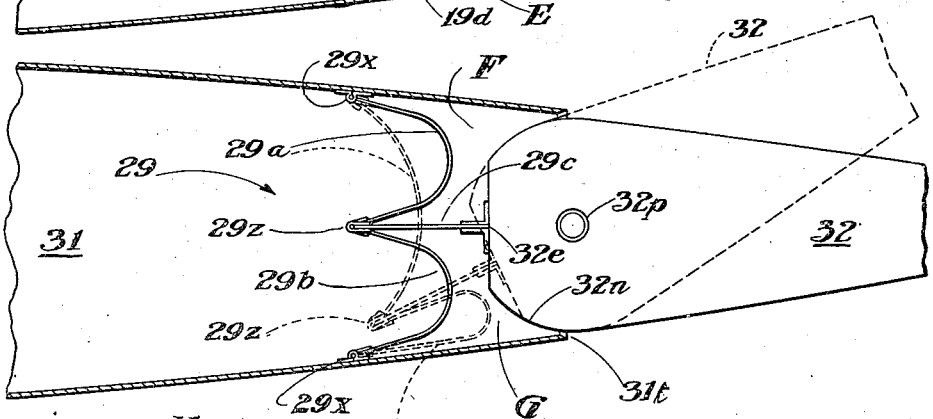
Fig. 8
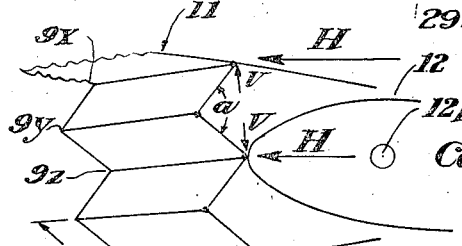
Fig. 9
Camille R. Lemonier
and Robert E. Waldron
INVENTORS
BY 
ATTORNEY Patented Aug. 9, 1949

2,478,830

UNITED STATES PATENT OFFICE 2,478,830

CONTROL SURFACE BALANCING MEANS

Camille R. Lemonier, Miami Beach, Fla., and Robert E. Waldron, Bowling Green, Ky., assignors to Curtiss-Wright Corporation, a corporation of Delaware Application June 7, 1944, Serial No. 539,140

8 Claims. (Cl. 244—87)

The present invention relates to the balancing of control surfaces and more particularly to improvements in means for balancing the torques acting upon movable aircraft control surfaces.

The desirability of providing an aerodynamic balance for the movable control surfaces of larger or higher speed aircraft and marine vessels has been recognized for some time. Many expedients have been resorted to in order to take advantage of the pressures induced by the relative motion of an airfoil and a fluid airstream to provide a counterforce or countertorque to assist the pilot in overcoming or balancing the forces to which the trailing portion of the movable surface is subjected upon its deflection into the airstream.

Certain of these prior means and methods for aerodynamically balancing the torque acting upon these surfaces have included such partitioning means as flexible diaphragms, hinged plates and rocking pistons for creating chambers within the airfoil at differential pressures, which when acting upon the intermediate partitioning means provide the necessary countertorque to oppose the forces acting upon the deflected surface.

Prior efforts have also been made to provide an effective countertorque or balance at the larger angles of deflection of the control surface, and the present invention relates particularly to an improved arrangement and relationship of hinged plates or articulated diaphragms by means of which the balance forces become increasingly greater and the balance made more effective and efficient as the deflection of the control surface is increased. These prior attempts to obtain such increasingly effective balances have met with serious difficulties in maintaining pressure seals between two relatively moving parts as well as due to separation of the laminar airflow, reversals in dynamic pressures, and for other reasons.

It is accordingly a major object of the present invention to provide an aerodynamic balance for a movable control surface which is increasingly effective and efficient as the angle of deflection of the surface is increased. It is a further object to provide an arrangement of hinged elements forming the compartment diaphragms or partitions which obviate to a great extent the necessity for pressure seals, and eliminate sliding contacts or relative movement between two adjacent elements. It is a further object to provide a hinged plate diaphragm which is so arranged that it develops a toggle action of great mechanical advantage in the deflected positions of the control surface.

Other objects and advantages of the present invention will become obvious to those skilled in the art after a reading of the following description together with the accompanying drawings in which:

Fig. 1 shows the application of one form of our invention to the vertical fin and rudder surface of an aircraft empennage in which a duct extends to the leading edge of the fin;

Fig. 2 is a cross sectional plan view of the same as taken along the line II—II of Fig. 1;

Fig. 3 is a similar sectional plan as Fig. 2 showing the disposition of the diaphragm linkage in a deflected attitude of the rudder;

Fig. 4 is an enlarged view of that portion of Fig. 3 which includes the diaphragm linkage and adjacent portions of the fixed and movable airfoils;

Fig. 5 is a detail perspective view of the hinged diaphragm elements in their approximate relationship as shown in Fig. 4;

Fig. 6 discloses a modification in which the hinged diaphragm is reversed from that of the above figures and the actuating air pressures enter entirely through the gaps between the fixed and movable surfaces;

Fig. 7 is a similar view of the mechanism shown in Fig. 6 as the movable surface is deflected;

Fig. 8 is a similar sectional view of a further modification embodying a spring diaphragm showing its relationship in both the neutral and deflected positions of the surface; and Fig. 9 is a diagram of the forces developed at the plate hinges.

Referring now to Fig. 1 there is shown the empennage or tail portion of an airplane having a fuselage or tail supporting boom 10, a fixed vertical surface 11 and a movable surface 12. The present invention is applicable to the rudder, elevator or aileron control, or other controls of aircraft or marine vessels, and while an airfoil, comprising a fixed vertical fin and a rudder for an aircraft, has been selected herein for explanatory purposes only, the invention is by no means limited thereto. For purposes of clarity the horizontal tail surfaces and elevators have been omitted from Fig. 1. The fixed airfoil 11 is preferably provided with a chordwise duct 13 extending from the leading edge 11n, and a spanwise or vertical duct 14 within the trailing portion of the fixed airfoil and immediately forward of the nose portion 12n of the rudder. The ducts 13 and 14 are formed by the rigid wall portions 15 extending from an opening at 11n at the leading edge of the fixed fin to an intermediate portion of the vertical duct 14 which extends substantially throughout the span of the movable surface, or at least along the length of its straight leading edge portion.

Referring now to the sectional plan views in Figs. 2 to 4 inclusive, it will be noted that the rudder 12 is rotatably mounted at its pivot 12p in the region of the trailing portion of the fixed airfoil 11. The rudder 12 has a trailing edge 12t and a leading edge or nose portion 12n forming a balance portion forward of the hinge axis 12p and entirely within the trailing edges 11t of the fixed fin. A partitioning means in the form of a series of hinged plates is provided at 9 serving to partition the interior spaces within the trailing portion of the fixed fin 11 into the lateral pressure compartments A and B, and the forward pressure compartment C. Inasmuch as the duct 14 is closed at its ends, and at the ends of the partitioning means 9, by either a seal or a flexible diaphragm, and the duct 13 is open to the airstream only at its mouth portion at 11n, the ramming effect of the forward motion of the airfoil through the fluid stream serves to build up a static pressure within the compartment C.

The partitioning means 9 comprises a series of four hinged or articulated plates 9a, 9b, 9c and 9d, each being preferably of the same dimension, material and weight. The plates 9a and 9b are intermediately hinged or pivoted at 9y, the other end of 9a being pivoted to the fixed fin 11 at 9x and the other end of the plate 9b being pivoted at 9z to the nose portion 12n of the rudder. Similarly the plate 9c is also hinged to both 9b and the leading edge 12n at the pivot 9z, and to 9d at the hinge 9y; and the remaining plate 9d is hinged to 9c at one edge and to the fixed airfoil at 9x at its other edge. In the normal or alined position of the rudder 12, and as viewed with the fixed airfoil away from, and with the rudder toward the reader, the hinge plate assembly 9 form the letter M, with its outer legs pivoted to the fixed airfoil and the intersection or vertex of its two middle legs hinged to the nose of the rudder.

In the perspective view in Fig. 5 is will be noted that the plates are preferably connected by means of a piano hinge construction of a type frequently used in aircraft and other fields. The hinge halves 9e are substantially U-shaped, having their open legs parallel and fastened about the edges of the respective plates. The intermediate pivots at 9y are divided between the two hinge halves with a rod or pin inserted between, and are divided between three hinge elements at the pivot 9z, the third element 9g attaching to the rudder nose. The hinges at the pivots 9x are similarly comprised of a hinge half 9e and a T-shaped hinge half 9f having oppositely extending legs by which it may be fastened to the fixed structure of the airfoil 11, which may either be the wall of the duct 14 or the outer skin of the airfoil. The third element 9g of the three part hinge at 9z is similarly shaped except that the outstanding legs are suitably curved to follow the leading edge curvature 12n of the rudder nose portion.

The operation of the aerodynamic balance of the modification shown in Fig. 2 is as follows:

In the neutral or alined position of the rudder 12 the static pressure in the lateral compartments A and B is substantially equal, and a static pressure of appreciably greater magnitude is developed by the dynamic pressure of the free airstream flowing into the mouth 11n of the duct 13. Let us now assume that the pilot applies "right" rudder, moving the surface into the position shown in Fig. 3 and distorting the articulated diaphragm 9 into the relationship shown in this figure. As a result of the change in airflow about the airfoil the pressure within the compartment A has been increased to a certain extent and the pressure within the compartment B reduced with respect to these values in the neutral position in Fig. 2, while the considerably greater pressure within the chamber C has remained substantially constant. The pressure from the side of the linkage diaphragm exposed to the compartment C is relied upon almost entirely for the operation of the modification shown in Figs. 1 to 5 inclusive, and the minor effect of the differential pressures within compartments A and B may be allowed for in the design of the balancing mechanism.

Referring now to the enlarged detail in Figs. 4 and 5 it will be noted that, in the deflected position of the rudder 12, the angle $a$ formed between the plates 9a and 9b on the compartment A side has been opened considerably and the angle $b$ between the plates 9c and 9d has been closed to a similar extent. At this deflected angle of the rudder the static pressure within compartment A will be positive and that within B will be negative. The pressure within compartment C is additive with respect to A and this sum is further assisted by the counter-clockwise pull due to negative pressure within compartment B. It will be appreciated that as these angles $a$ and $b$ of the plates are continued to be increased and reduced, respectively, this counter-clockwise force exerted in the form of torque about the pivot axis 12p becomes increasingly greater in favor of plates 9a and 9b as the angle of deflection of the movable surface is increased. It will also be obvious that as the links 9a and 9b approach forming a straight line, the toggle effect of the force exerted on the control surface at the hinge axis 9z will be relatively high at a time when the trailing portion of the movable surface is deflected through its maximum angles and the airstream forces to which it is subjected are at their highest magnitude. On an actual installation the desired geometry of the system can be obtained by determining the airfoil pressure distribution and by the relationship of the forces and loads on the hinged plates or baffles. For equal length arms of the respective hinged plates this relationship of the forces is diagrammatically indicated in Fig. 9 will be in accordance with the following:

Where the spanwise length is L and the length of the lever arm or distance between hinge points is $l$, the area A of one plate will be the product of these dimensions for:

$$A = L \times l$$

Where $p$ is the static pressure in pounds per square inch, H is the horizontal resultant per unit spanwise length and $a$ the intervening angle subtended by the adjacent hinge plates, the force will be the product of the pressure times the area and the total force will be:

$$H = p \times l \times L \sin \frac{a}{2} = pA \sin \frac{a}{2}$$

If L is taken as unity then H per unit spanwise length is:

$$H = pl \sin \frac{a}{2}$$

Under the same conditions this also applies to the vertical or laterally outward resultant V, as follows:

$$V = pA \left( \cos \frac{a}{2} - \frac{l}{2 \cos \frac{a}{2}} \right)$$

And for V per unit spanwise length:

$$V = pl\left(\cos\frac{a}{2} - \frac{l}{2\cos\frac{a}{2}}\right)$$

The directions of the resultant forces will of course be reversed when the pressures are changed from positive to negative, and vice versa.

In the modifications shown in Figs. 6 and 7 the forward pressure compartment C is dispensed with and the balance actuated by the pressures developed within the two rear laterally disposed compartments D and E. In these figures 21 represents the fixed airfoil having a trailing portion 21t to which is pivotally mounted the movable surface or rudder 22 about its pivotal axis at 22p. The articulated diaphragm is represented by the numeral 19 comprising the hinged plates 19a, 19b, 19c, 19d which are similarly intermediately hinged at 19y, 19z and to the fixed airfoil pivots at 19x. The arrangement of the plates in this modification is, however, reversed from that of the above described form in that when viewed from the trailing edge of the rudder looking forwardly toward the leading edge the plates form the letter W.

This arrangement in Figs. 6 and 7 causes the pivot hinges 19y to be rearwardly disposed and the intermediate hinge 19z along the centerline of the airfoil to be forwardly disposed. A rigid nose plate 19e which serves as a rocking vane or piston is fixedly attached as by the angles to the leading edge of the rudder at 22l and the forward edge of this plate 19e is provided with a hinge part articulated together with the adjacent plate sections 19b and 19c by means of the hinge pin 19z. The leading edge 22n of the rudder is also preferably given a curvature concentric with the axis of the hinge 22p such that as the surface is deflected or rotated the gaps between the arcuate nose portions and the trailing edges 21t remain substantially equal to each other and constant throughout the operation of the surface. In this modification the face within the fixed airfoil forward of the articulated diaphragm is not ducted to the airstream but remains substantially at or about the pressure of the surrounding undistrubed atmosphere at a given altitude.

As the rudder is deflected through the angle shown in Fig. 7 the static pressure within the compartment D is built up into a positive value and the pressure within the compartment E will at the same time be reduced. As in the above described modification the outward thrust or counter-clockwise turning moment exerted by the toggle action of the straightened plates 19a and 19b increases materially over the opposing force exerted by the almost collapsed plates 19c and 19d, the difference in these forces per degree of surface deflection increasing greatly as the surface is deflected farther from its neutral position.

A further modification is shown in Fig. 8, being particularly adapted to installations of the type shown in Figs. 6 and 7 in which the mechanical advantage at the larger angles of deflection may become too great and would have to be maintained at lower values. In this modification, two resilient plates 29a and 29b, of substantial U-shape, having their convex surfaces facing rearwardly toward the pressure compartments F and G, between the fixed airfoil 31 and the surface 32, corresponding to compartments D and E of Figs. 6 and 7. The adjacent edges of the spring or resilient vanes 29a and 29b are hinged together with a third hinge element at the pivot 29z formed at the forward end of the rigid plate or rocking vane 29c, which in turn is rigidly attached to the leading edge portion 32l of the rudder. The opposed outer edges of the resilient plates forming the articulated diaphragm 29 in this modification are hinged to the fixed airfoil 31 at the pivots 29x. The nose portion 32n of the rudder is similarly formed with the axis of the hinge pin 32p as a center and the arrangement is otherwise similar to the modification shown in Figs. 6 and 7.

It will accordingly be noted that as the surface is deflected into its dotted position the plate 29a is extended into a nearly flat condition whereas the lower plate 29b, as indicated in the dotted lines, is folded or bent back upon itself into a substantially bowed condition. While the pressures within the compartments F and G are substantially similar in value to those in compartments D and E for similar angles of deflection of the rudder and a similar toggle action force applied upon the extended plate 29a, the plate 29b at the same time opposes its deflection into the dotted position and accordingly resiliently opposes and reduces the mechanical advantage obtained in the prior modifications by means of the freely hinged plates. The use of such resilient spring plates can of course also be utilized in the forms of this invention as set forth in Figs. 1 to 5 inclusive in installations where it is desired that the mechanical advantage be controlled or reduced to certain extents.

It will accordingly be noted that the present invention combines the effect of the dynamic pressure and the toggle linkage in both that type of aerodynamic balance in which the differential pressures are obtained through the gaps between the trailing edges of the fixed airfoil and the nose portion of the movable airfoil, as well as in that type in which the pressure is led through a duct from the leading edge of the fixed airfoil.

As indicated above, the present invention is not limited to rudders but is also useful in ailerons or other roll control means, elevators, and other control surfaces, and the dynamic pressure compartments may either be fed by a single central duct as shown in the drawings or through orifices or openings in the side of the fixed surfaces, and valves may be installed in the system to regulate the airflow through these orifices. In such dynamic pressure systems utilizing the hinge or spring toggle link arrangement, the link hinges may or may not be sealed inasmuch as the leakage therethrough is relatively slight. Other forms and modifications both in respect to the general arrangement or the details of the respective parts, which may become apparent to those skilled in the art upon reading the present description, are intended to come within the scope and spirit of the present invention as more particularly defined in the accompanying claims.

We claim:

1. In an aerodynamic balance for aircraft having a fixed main airfoil and a control surface pivotally attached thereto, a fluid chamber formed within said main airfoil, pressure communicating means extending between said fluid chamber and the exterior surface of said airfoil for increasing and varying the fluid pressure in said fluid chamber, diaphragm means extending across said fluid chamber in the direction of the thickness of said airfoil forming a toggle arrangement flexibly interconnecting the leading edge of said control surface with fixed portions of said main airfoil, said flexible diaphragm dividing said fluid chamber into a forward and at least two rearward fluid pressure compartments whereby application of said fluid pressures upon said diaphragm toggle arrangement causes it to develop a mechanical advantage for balancing the aerodynamic forces to which said control surface is subjected when deflected into the airstream.

2. Means for balancing torques acting on aircraft control surfaces comprising in combination, a fixed airfoil having a hollow trailing portion, a pressure conduit extending from said hollow portion to the airstream about said airfoil, an articulated diaphragm extending transversely across the thickness of said fixed airfoil subdividing said hollow portion of said fixed airfoil into front and rear pressure chambers, a control surface pivotally mounted upon said fixed airfoil for rotative movement with respect thereto, the leading edge of said control surface being pivotally attached to an intermediate portion of said articulated diaphragm whereby the rear said chamber is laterally subdivided into opposed pressure chambers, said articulated diaphragm being of sufficient rigidity on each side of its said intermediate pivotal attachment to provide a toggle effect between said fixed airfoil and said control surface and means to vary the pressures within all of said chambers resulting from airflow over said airfoil whereby increased balancing forces are imparted to said control surface through the toggle effect of said articulated diaphragm at increasingly deflected positions of said control surface.

3. In an aerodynamic balance arrangement for aircraft having an airfoil comprising a relatively fixed main portion, a relatively movable control portion pivotally attached to said fixed portion, a pressure compartment disposed within said fixed portion, and a pressure conduit extending from said compartment through the exterior surface of said airfoil, toggle means pivotally interconnecting said fixed and movable portions extending across said compartment in the direction of the thickness of said airfoil to divide said compartment into a plurality of pressure chambers whereby said toggle means forms an intermediate flexible wall of said chambers within said pressure compartment for the development of increasing balance forces for transmission to said movable control portion upon its increased displacement from an aligned position with respect to said fixed main portion.

4. An aerodynamic balance arrangement for aircraft including a relatively fixed airfoil, a relatively movable control portion pivotally mounted thereon and a hollow portion within the said fixed airfoil in the region of the said control surface pivotal mounting, the said fixed airfoil having its outer surfaces extending rearwardly of the nose portion of said control surface and spaced from the side faces thereof, an articulated diaphragm extending across said hollow portion in the direction of the thickness of said airfoil from pivotal attachments to said fixed airfoil and having an intermediate portion attached to the leading edge of said movable airfoil whereby said hollow portion is divided into a forward pressure chamber and laterally disposed differential pressure chambers, a pressure conduit extending from said forward chamber to the exterior of said fixed airfoil, the said articulated diaphragm arranged to develop a toggle effect between said fixed airfoil and said movable control portion to impose balancing forces upon said movable control portion when deflected from its neutral position.

5. An aerodynamic balance arrangement for an aircraft having an airfoil comprising a relatively fixed main portion, a relatively movable control portion pivotally attached to a trailing part of said main portion and a recess within the rear portion of said fixed main portion adapted to form a pressure chamber, toggle means in the form of at least two V-arranged pairs of articulated plates pivotally interconnecting said fixed and movable airfoil portions disposed within said pressure chamber across the thickness of said airfoil arranged to define a forward compartment and a pair of rear compartments, orifice means arranged for the pressurization of said pressure chamber by the airflow exerted on the exterior of said airfoil whereby toggle effect balance forces developed within said pressure chamber by the respective pressures in said several compartments are transmitted by said articulated plates to said movable control portion upon displacement of the same from its neutral position with respect to said fixed main airfoil portion.

6. In an aerodynamic balance arrangement for aircraft having an airfoil including a relatively fixed main portion, a relatively movable control portion pivotally attached to said fixed portion, a fluid space disposed within a hollow trailing portion of said fixed portion, and fluid passage means extending from said fluid space to the exterior of said airfoil, toggle means pivotally interconnecting said fixed and movable portions of said airfoil extending transversely across said fluid space in the direction of the thickness of said airfoil to divide said fluid space into fluid chambers subjected to pressure differentials transmitted through said fluid passage means whereby said toggle means forms an intermediate flexible wall of said fluid chambers within said fluid space for the development of increasing toggle forces for transmission to said movable control portion upon its increased displacement from an aligned position with respect to said fixed main airfoil portion.

7. In an aerodynamic balance arrangement for aircraft having an airfoil with a relatively fixed main portion and a relatively movable control portion pivotally supported from the trailing portion of said fixed main portion, partitioning means in cooperation with said airfoil portion and said movable control portion defining a fluid space within said fixed airfoil trailing portion, fluid passages extending between said fluid space and the airstream around the exterior of said airfoil through which fluid pressures are transmitted to said fluid space, said partitioning means including a pair of toggle diaphragms pivotally interconnecting said fixed and movable airfoil portions, each said toggle diaphragm forming an intermediately hinged wall extending transversely across said fluid space forming fore and aft fluid chambers within which pressure differentials may be created as said control portion is moved from its neutral position, each said toggle diaphragm disposd in such manner that the apex of the toggle at its intermediate hinge axis is pointed toward the fluid chamber subjected to the greater internal pressure whereby as the apex of one diaphragm is flattened as the control portion is moved farther away from its neutral position, the greater fluid pressure provides correcting toggle effect forces for balancing the increased aerodynamic forces acting upon said moved control portion.

8. In an aerodynamic balance for aircraft including a relatively fixed main airfoil, a relatively movable control surface pivotally mounted upon the trailing portion of said main airfoil, said main airfoil having a hollow trailing portion forming a fluid space within which the nose of said control surface is arranged to be moved, and fluid passage means extending from said fluid space to the airstream at spaced points at the exterior of said airfoil for the communication of differential air pressures to said fluid space, the improvement of partitioning means including a pair of hinged diaphragms pivotally connected at transversely spaced axes to the said main airfoil and to the leading edge of said control surface, the said hinged diaphragms being pivotally interconnected intermediate the pivotal connections to said main airfoil and to said control surface, said hinged diaphragms dividing said fluid space into fluid chambers subject to pressure differentials, the intermediate pivot of said hinged diaphragms forming an apex pointing toward the fluid chamber normally subjected to the greater of the differential pressures, said partitioning means arranged in such manner that as said control surface is moved from its normal aligned position the apex of said hinged diaphragms becomes increasingly flatter in the angle one diaphragm makes with the other and the increased pressure in the greater of said fluid chambers acting upon said flattened diaphragms creates an increasing toggle effect for the balancing of the aerodynamic forces to which said deflected control surface is subjected.

CAMILLE R. LEMONIER.
ROBERT E. WALDRON.

REFERENCES CITED

The following references are of record in the file of this patent:

UNITED STATES PATENTS

| Number | Name | Date |
|---|---|---|
| 2,211,870 | Wagner et al. | Aug. 20, 1940 |
| 2,239,475 | Weick | Apr. 22, 1941 |
| 2,331,047 | Schairer | Oct. 5, 1943 |